Sept. 15, 1942. H. J. G. RUDOLF 2,296,189
LIQUID-LEVEL INDICATOR
Filed May 5, 1937
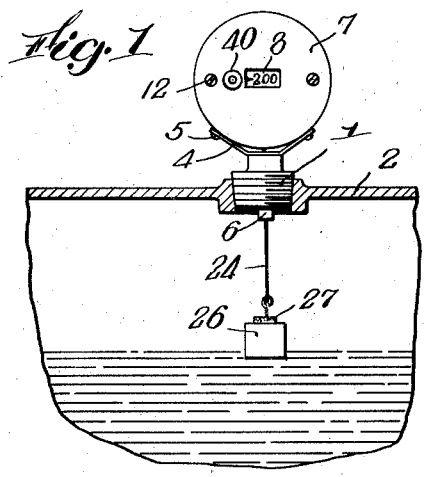
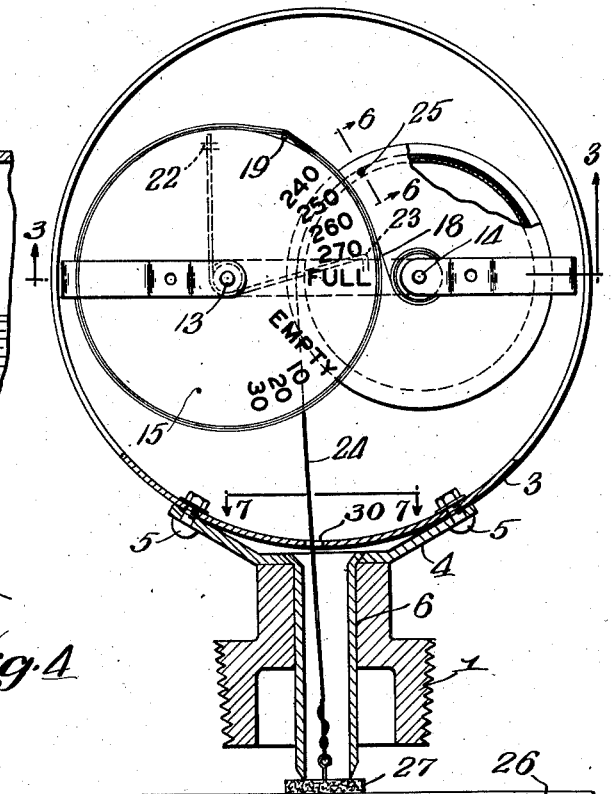
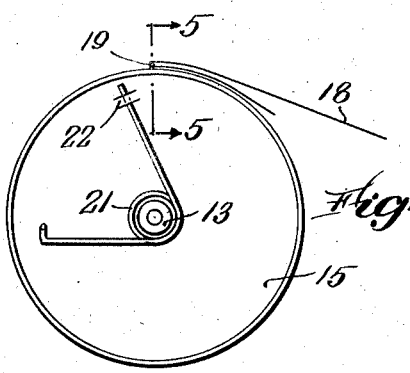
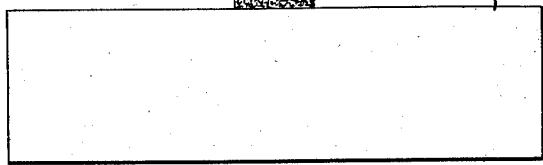
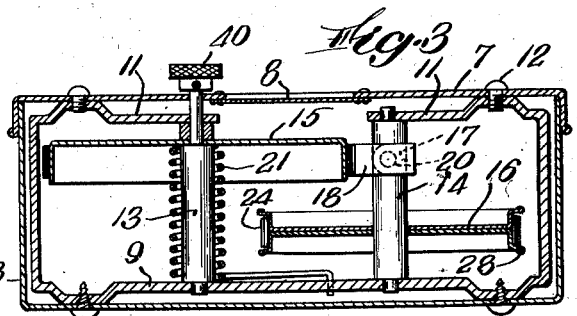
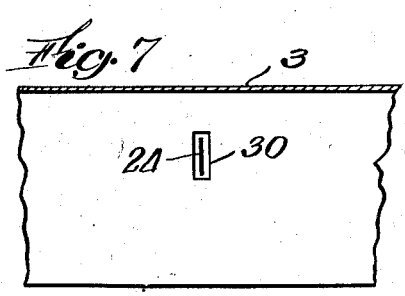

Patented Sept. 15, 1942

2,296,189

UNITED STATES PATENT OFFICE 2,296,189

LIQUID-LEVEL INDICATOR

Henry J. G. Rudolf, Galesburg, Ill., assignor, by direct and mesne assignments, to The Applied Mechanics Co., Wellesley, Mass., a corporation of Massachusetts Application May 5, 1937, Serial No. 140,872

3 Claims. (Cl. 73—321)

This invention relates to indicating mechanisms and more particularly to liquid-level indicators of the type comprising a casing having a depending plug adapted to thread into an opening in the top of a tank. Objects of the invention are to provide a mechanism which is simple and inexpensive in construction and accurate and durable in use, which can be readily assembled and disassembled, which can be fabricated from parts which can be readily and inexpensively manufactured, which has minimum friction and therefore is responsive to slight changes in liquid-level, which has substantially no loss-motion and is therefore extremely accurate, which automatically prevents overflow through the opening in which the device is mounted, which can be manually actuated exteriorly of its casing to check the operability of the interior mechanism, which is equally accurate during either rise or fall of the liquid-level within the tank and which is generally superior to prior indicators for the same general purpose.

In one aspect the present invention involves pulleys, preferably in the form of drums, and belts, preferably in the form of tapes, adapted to wind upon the periphery of the pulleys. Two of the pulleys are arranged in alignment and one of the belts is adapted to wind upon either pulley from the other pulley. A spring is associated with one pulley to wind the belt on that pulley from the other pulley, and control means including a float are arranged to actuate the other pulley against the action of the spring. One of the pulleys is preferably larger than the other and an indicator is associated with the larger pulley. Another large pulley is preferably interconnected with the smaller pulley, as for example by fastening the two pulleys to a common axle, with a second belt having a portion wound on the third pulley and another portion connected with the aforesaid float. By making the pulleys in the form of drums and the belts in the form of tapes, the belts wind smoothly on and off the pulleys without a tendency to jump off or wind irregularly. The peripheries of the drums are preferably provided with transverse wire bails or other form of elongate anchors extending across the peripheries of the drums over which the folded ends of the tapes may readily be hooked to attach the tapes to the drums. The axles for the drums are preferably mounted in the indicator casing by means of a U-shaped bracket having inturned ends to receive corresponding ends of the axles respectively. In another aspect of the invention the float has uniform rectangular vertical cross-sections from end to end so that its wetted perimeter is the same at all floating levels, thereby improving the accuracy of the indications. In still another aspect of the invention one of the aforesaid drums comprises two cup-shaped sheet-metal parts disposed bottom to bottom, thereby affording a very reliable and inexpensive way of forming the drum. In a further aspect of the invention the device comprises a tube extending through an opening in the aforesaid threaded plug, the upper end of the tube being expanded over a part of the indicator to anchor the indicator casing to the plug, the lower end of this tube also preferably serving as a valve seat against which a valve on the float is adapted to seat to prevent overflow of liquid through the indicator casing. In still another aspect the invention comprises manually operable means exterior of the casing with which to actuate the indicator drum independently of the float, thereby to check the operability of the device.

For the operation of gauges of the type herein referred to very little power is available. Consequently their accuracy is seriously affected by friction between the moving parts and particles of dirt which find their way into the mechanism. By using drums and tape instead of gears the friction and effect of dirt are minimized, thereby greately increasing the sensitivity and accuracy of the device. Whereas wire cable requires special grooves on the pulleys (and even then often jumps off or bunches on the pulleys) the tapes require only smooth-surface drums of simple construction and have substantially no tendency to jump off the drums or bunch on the drums.

For the purpose of illustration a typical embodiment of the invention is shown in the accompanying drawing in which, Fig. 1 is an elevation of the device mounted in a tank;

Fig. 2 is an enlarged vertical cross-section;

Fig. 3 is a horizontal section on line 3—3 of Fig. 2;

Fig. 4 is an elevation of the indicator drum with its associated spring, axle and belt;

Fig. 5 is a section on line 5—5 of Fig. 4 with the belt omitted;

Fig. 6 is a section on line 6—6 of Fig. 2 with the belt omitted; and

Fig. 7 is a section on line 7—7 of Fig. 2.

The particular embodiment of the invention chosen for the purpose of illustration comprises a plug 1 adapted to thread into an opening in the top of a tank such as shown at 2, a cup-shaped casing 3 mounted on the plug by means of a strap saddle 4 and bolts 5 and a tube 6 fast in an opening in the plug 1 and having its upper end flanged outwardly over the periphery of an opening in the strap 4, and a cover 7 telescoping over the open end of the cup-shaped casing 3, the cover 7 having a transparent window 8 which is preferably in the form of a magnifying glass to facilitate reading the indication of the indicator inside the casing.

As shown in Fig. 3 a U-shaped bracket 9 is mounted inside the casing 3 by means of screws 10, the ends of the bracket being bent inwardly at 90° to form inturned flanges 11 and the cover 7 being secured to these flanges by means of screws 12. Pivotally mounted on the bracket 9 are two axles 13 and 14. Fast to the axle 13 is a large drum 15 and fast to the axle 14 are two drums, a large drum 16 and a small drum 17, the latter drum being in alignment with the drum 15. The drums 15 and 17 are interconnected by a thin metallic belt 18, the opposite ends of which are secured to the two drums respectively. One end of the belt is secured to the drum 15 by folding the end of the belt inwardly through 180° and hooking the folded end over a bail 19 secured to the periphery of the drum by a solder or otherwise as illustrated in Fig. 5. The other end of the belt 18 is riveted, soldered or otherwise secured to the drum 17 as indicated at 20 in Fig. 3. A coil spring 21 surrounds the axle 13 with one end secured to the drum 15 as indicated at 22 and the other end 23 hooked over the bracket 9, the spring tending to rotating the drum 15 in a counterclockwise direction (Fig. 2).

A second tape 24 is wound upon the periphery of the drum 16, its upper end being folded under 180° and hooked over an anchor 25 which may be in the form of a wire soldered to the flanges of the pulley of the drum as illustrated in Fig. 6. The tape 24 extends downwardly through a guide slot 30 in the periphery of the casing 3 and the lower end of the tape is anchored to the float 26 which carries a valve 27 of cork or other suitable material adapted to seat against the lower end of the tube 6 when the tank is filled. The float has the same square cross-section throughout its length, whereby the wetted perimeter of the float is always the same irrespective of the depth to which the float is submerged in the liquid. Fig. 1 shows the float in end elevation and Fig. 2 in side elevation.

The tapes 18 and 24 are preferably formed of beryllium copepr which is unique in having all the desirable characteristics for this purpose without any of the disadvantages of other materials. Tapes of beryllium copper may be formed very thinly without danger of breaking or becoming permanently deformed; they are hard and springy but not brittle and they are non-corrosive.

The pulley 15 carries the dial indications on its front side as indicated in Figs. 1 and 2, these indications preferably being printed on the sheet metal before it is shaped into the form of a cup. As shown in Figs. 3 and 6 the drum 16 preferably comprises two cup-shaped sheet-metal parts secured together bottom to bottom, these parts resembling can covers and preferably being formed in the same way, with their peripheral edges rolled over as indicated at 28.

As shown in Fig. 3 the axle 13 projects through an opening in the cover 7 and a knurled handle 40 is fastened to the outer end of the handle, whereby the interior mechanism may be actuated to test the operability of the device. For example, by turning the handle 40 counterclockwise the float may be lifted above the liquid and then permitted to drop back. If the indicator returns to its former position the operator knows that the device is functioning properly.

When the liquid-level in the tank 2 is falling the float 26 gradually settles downwardly, thereby unwinding the tape 24 from the drum 16, turning the drums 16 and 17 in a counter-clockwise direction (Fig. 2), winding the tape 18 from the drum 15 to the drum 17, and turning the drum 15 in a clockwise direction (Fig. 2) against the action of the spring 21. During the rise of liquid-level the action is reversed, the spring 21 keeping the tapes taut.

The preferred method of assembling the parts is first to insert the drum 15, with its associated axle 13 and spring 21, by springing the flange 11 of the bracket 9 outwardly far enough to permit the insertion of the ends of the axle into the openings in the bracket. With the tape 18 wound upon the drum 17 this drum, together with its associated axle 14 and drum 16, is then inserted in the bracket by springing the other flange 11 outwardly. The drum 15 is then turned in a clockwise direction about three turns thereby to wind the spring 21, after which the end of the tape 18 is hooked over the bail 19 of the drum 15. The spring 21 is then permitted to rotate drum 15 about two turns in a counterclockwise direction, thereby to wind part of the tape 18 from the drum 17 to the drum 15. This action of the spring 21 is stopped when the bail 25 on drum 16 faces the slot 30 in the casing 3, at which position the upper end of the tape 24 can be conveniently hooked over the bail 25. Of course the parts are so correlated that when the float 26 is in the upper position shown in Fig. 2 the "Full" indication on the drum 15 shows through the window 8 and when the float 26 rests on the bottom of the tank the word "Empty" shows through the window.

The use of drums and tape instead of gears affords a number of advantages. Not only are friction and lost-motion greatly reduced but particles of dirt are compressed between the turns of belt without offering substantial resistance to the movement of the parts and without substantially affecting the accuracy of the indication. Moreover the parts are reduced in number, particularly when one drum is utilized as a dial; and the construction is more economical, not only because of the difference in the individual parts but also because of the greater ease with which they can be aligned and kept in alignment.

By forming the slot 30 in the periphery of the casing 3 the tape is guided and prevented from twisting without the necessity of a separate plug or other guide.

It should be understood that the present disclosure is for the purpose of illustration only and that this invention includes all modifications and equivalents which fall within the scope of the appended claims.

I claim:

1. A liquid-level indicator for attachment to an opening in the top of a tank, comprising a casing having a window in one wall, means for mounting the casing over said opening, two shafts mounted in the casing with their axes intersecting said wall, a drum on one shaft with the outer marginal portion of one side of the drum in juxtaposed overlapping relation to said window and with calibrations on said side of the drum distributed circumferentially around said marginal portion, small and large drums on the other shaft, the small drum being aligned with said first drum with a tape kinematically interconnecting the two drums, one end of the tape being anchored to the small drum and the other end of the tape being anchored to said first drum, the large drum overlapping the side of the first drum opposite to said calibrated side, a float, a float tape wound on said large drum, and a spring associated with said first drum for holding said first tape taut and tending to wind the float tape on said large drum.

2. A liquid-level indicator for attachment to an opening in the top of a tank, comprising a cylindrical casing having a window in one end wall near the axis of the casing, means for mounting the casing over said opening, two shafts mounted in the casing with their axes intersecting said wall on opposite sides of said window, a drum on one shaft with the outer marginal portion of one side of the drum in juxtaposed overlapping relation to said window and with calibrations on said side of the drum distributed circumferentially around said marginal portion, small and large drums on the other shaft, the small drum being aligned with said first drum with a tape kinematically interconnecting the two drums, one end of the tape being anchored to the small drum and the other end of the tape being anchored to said first drum, the large drum overlapping the side of the first drum opposite to said calibrated side, a float, a float tape wound on said large drum, and a coil spring surrounding said second shaft for holding said first tape taut and tending to wind the float tape on said large drum.

3. A liquid-level indicator for attachment in an opening in the top of a tank, comprising a casing having a window in one side, means for mounting the casing over said opening, an axle mounted in the casing to rotate about an axis intersecting said wall adjacent said window, a drum having a disk-shaped end fast to the shaft and an integral peripheral flange extending at right-angles from said end, the outer marginal portion of one side of said end facing said window and having calibrations thereon, a second axle mounted in the casing parallel to the first axle, large and small drums on said second shaft, a tape having one end fast to said flange of the first drum and the other end fast to said small drum, the tape extending from one drum to the other drum across the plane defined by the axes of the two drums, a float in the tank, means kinematically interconnecting said large drum and float through said opening including a tape wound on the large drum, and a coil spring on said first axle for holding said first tape taut and tending to wind said second tape on the large drum.

HENRY J. G. RUDOLF.